United States Patent [19]

Olson et al.

[11] Patent Number: 4,490,774

[45] Date of Patent: Dec. 25, 1984

[54] CAPACITORS CONTAINING POLYFUNCTIONAL ACRYLATE POLYMERS AS DIELECTRICS

[75] Inventors: Daniel R. Olson; Timothy W. O'Donnell, both of Schenectady, N.Y.

[73] Assignee: General Electric Company, Schenectady, N.Y.

[21] Appl. No.: 562,871

[22] Filed: Dec. 19, 1983

[51] Int. Cl.³ .......................... H01G 4/06; H01B 3/20
[52] U.S. Cl. ...................................... 361/311; 252/578
[58] Field of Search .................. 252/567, 578, 579; 361/311–315, 323

[56] References Cited

U.S. PATENT DOCUMENTS

| | | | |
|---|---|---|---|
| 3,743,532 | 7/1973 | Wright et al. | 117/93.31 |
| 4,243,818 | 1/1981 | Rogier | 560/224 |
| 4,329,419 | 5/1982 | Goff et al. | 430/283 |

FOREIGN PATENT DOCUMENTS 1215001 12/1970 United Kingdom ............... 252/578

*Primary Examiner*—Donald A. Griffin
*Attorney, Agent, or Firm*—William H. Pittman; James C. Davis, Jr.; James Magee, Jr.

[57] ABSTRACT

Novel capacitors comprise two electrodes and, as a dielectric member, a polymer of at least one polyfunctional acrylate of the formula

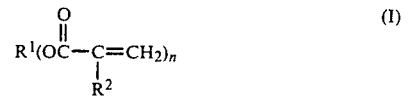

wherein $R^1$ is an aliphatic, alicyclic or mixed aliphatic-alicyclic radical having about 10–40 carbon atoms which is preferably branched, $R^2$ is hydrogen or methyl, and n is from 2 to 4. Said capacitors are characterized by a low dissipation factor.

20 Claims, No Drawings

CAPACITORS CONTAINING POLYFUNCTIONAL ACRYLATE POLYMERS AS DIELECTRICS

This invention relates to capacitors and dielectrics for use therein.

Capacitors are used in a wide variety of electrical circuits, for example in relatively high voltage AC power systems (such as the common 110-volt systems) and in relatively low voltage (e.g., under 50 volts) DC systems frequently encountered in printed circuits and the like. Important factors which must be considered in the manufacture of such capacitors are efficiency, temperature of operation, dissipation factor, length of life and behavior upon failure.

Efficiency is normally measured in terms of capacitance per unit volume. High efficiency is desirable, with values of at least 50 microfarads per cubic inch being preferred. Operating temperature and dissipation factor are related since many capacitors, especially operating at relatively high temperatures, function inadequately because they dissipate their electrical energy as heat. Long life, preferably hundreds or thousands of hours, is advantageous.

Finally, the behavior of a capacitor upon failure may be a critical factor in the operation of the circuit in which the capacitor is used. Upon failure of a ceramic capacitor, for example, the circuit is not broken and surges in voltage and/or current may caused damage to other components therein. It is desirable that breakage of the circuit occur when a capacitor fails, thereby preventing such damage.

In copending, commonly assigned applications Ser. No. 562,779 filed Dec. 19, 1983, and Ser. No. 620,647, filed June 14, 1984, there is disclosed a novel capacitor structure having particularly advantageous properties with respect to these and other criteria. This structure comprises successive conductive layers which are offset so as to define a central capacitance region of stacked isolated extending layers, a coating of dielectric deposited on each said layers so that the layers in the capacitance region are substantially spaced and separated by said coating of dielectric, the deposition of said coating being controlled so as to slope toward cutoff lines spaced substantially from two separated portions of the central capacitor region, said conductive layers extending beyond said cutoff lines so that successive layers fuse into spaced apart terminal portions, and said cutoff line spacing being sufficient to cause the uppermost dielectric coating of the capacitor to have a horizontal dimension from the capacitor region to the terminal portion to accept a final layer deposition. Most often, said capacitors contain at least 100 dielectric-coated electrode layers. Copending, commonly assigned application Ser. No. 562,873 filed Dec. 19, 1983 discloses a wide variety of polyfunctional acrylate polymers useful as dielectrics in these and other capacitors. The disclosures of both of the aforementioned applications are incorporated by reference herein.

A principal object of the present invention is to provide polyfunctional acrylates which, upon polymerization, yield materials suitable for use as dielectrics.

Another object is to provide polymeric dielectric materials useful in thin film capacitors.

A further object is to provide monomers which are easy to deposit as thin films, said films being subsequently polymerizable by irradiation or the like to form layers useful as dielectrics in thin film capacitors.

Still another object is to provide improved capacitors featuring dielectrics with long life, low dissipation factor and, in many instances, relatively constant capacitance over a wide temperature range.

Other objects will in part be obvious and will in part appear hereinafter.

In their broadest definition, the capacitors of this invention comprise two electrodes separated by a dielectric member, said dielectric member comprising a polymer of at least one polyfunctional acrylate having the formula

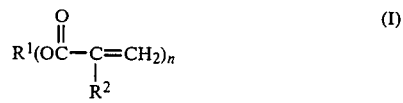

wherein:

$R^1$ is an aliphatic, alicyclic or mixed aliphatic-alicyclic radical having about 10–40 carbon atoms which optionally contains up to about three olefinic linkages, said olefinic linkages being non-conjugated;

$R^2$ is hydrogen or methyl; and n is from 2 to 4.

The electrodes in the capacitors of this invention may be formed of materials and in configurations known in the art. Typical conductive materials are aluminum, copper, zinc, tin, stainless steel and alloys thereof, with aluminum being preferred.

The dielectric members are polymers of polyfunctional acrylates or methacrylates, preferably acrylates, derived from a wide variety of polyhydroxy compounds of the formula $R^1(OH)_n$. The radical $R^1$ may be aliphatic, alicyclic or mixed aliphatic-alicyclic; it may optionally contain up to about three olefinic linkages which are non-conjugated, and contains about 10–40 carbon atoms. Suitable polyhydroxy compounds include straight chain compounds such as hexadecanediol and octadecanediol, with the hydroxy groups being located anywhere on the chain, and branched chain isomers thereof. By "branched chain" is meant that at least one carbon atom is present in a branch. Thus, configurations such as

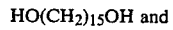

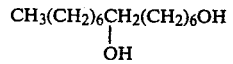

are unbranched, while

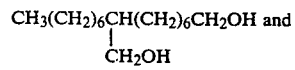

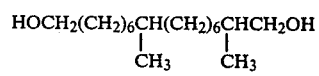

are branched.

A first preferred class of polyhydroxy compounds consists of those characterized by being branched and also by having at least 18 carbon atoms in a single chain; that is, at least 18 carbon atoms are successively bonded without branching. Particularly suitable polyfunctional acrylates derived therefrom are those having the formulas

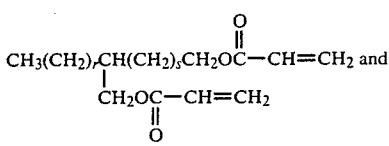

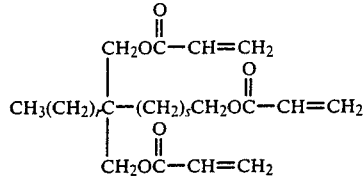

wherein r and s are each 7 or 8 and the sum of r and s is 15. They may be obtained, for example, by acrylic acid esterification of the hydroformylation products of oleic acid, as disclosed in U.S. Pat. No. 4,243,818. Another suitable compound is 1,12-octadecanediol diacrylate, formed by hydrogenolysis of ricinoleic acid followed by esterification.

Also within this first preferred class of polyhydroxy compounds are single compounds and mixtures, usually mixtures, in which $R^1$ is at least one aliphatic or alicyclic radical containing about 20–40 carbon atoms and optionally up to about three non-conjugated olefinic linkages. At least about 40%, and preferably at least about 50%, of the total number of $R^1$ radicals therein are alicyclic. Thus, the polyhydroxy compounds may be entirely alicyclic or may be mixtures of acyclic and alicyclic compounds satisfying these percentage limitations. Acrylates prepared from such polyhydroxy compounds, and their polymers, are disclosed and claimed in copending, commonly assigned application Ser. No. 562,894, filed Dec. 19, 1983 the disclosure of which is incorporated by reference herein.

It is frequently convenient to prepare such polyhydroxy compounds by reduction of at least one corresponding polycarboxylic acid or ester thereof, which may be saturated or may contain olefinic linkages. A typical suitable polycarboxylic acid is linoleic acid dimer (hereinafter "dimer acid"), a mixture consisting essentially of acyclic, monocyclic and bicyclic dicarboxylic acids which typically contain up to two olefinic bonds per molecule. A particularly suitable dimer acid is sold by Emery Industries under the trade designation "Empol 1010". According to Kirk-Othmer, *Encyclopedia of Chemical Technology*, Third Edition, Volume 7, pp. 768–770, the following are structures of typical molecular species present in the methyl ester of dimer acid:

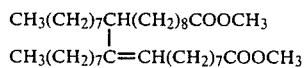

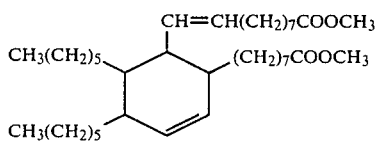

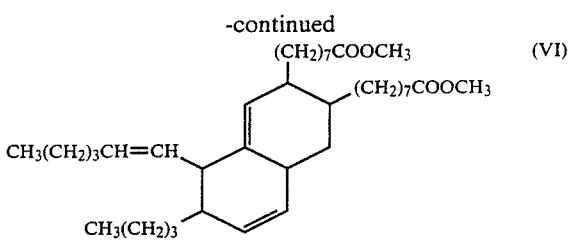

Thus, free dimer acid obviously comprises free dicarboxylic acids having corresponding structures.

The esters of formulas IV, V and VI, their corresponding free acids, and similar polycarboxylic acids and esters may be reduced by known methods, such as by hydrogen in the presence of a hydrogenation catalyst or by lithium aluminum hydride, to produce diols useful for preparation of the polyfunctional acrylates of this invention. Depending on the method of reduction of these or similar acids or esters, the reduction product may be saturated or may contain olefinic linkages. For example, lithium aluminum hydride reduction normally will not affect olefinic linkages while some hydrogenation methods (e.g., in the presence of a palladium catalyst) will reduce them to saturated linkages. Thus, reduction of compounds IV, V and VI may produce diols of the respective formulas

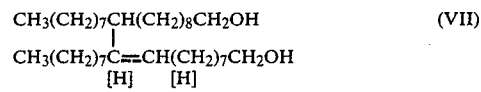

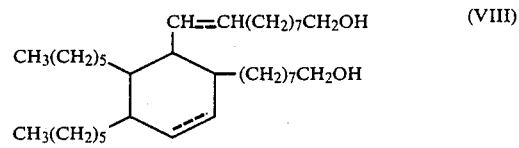

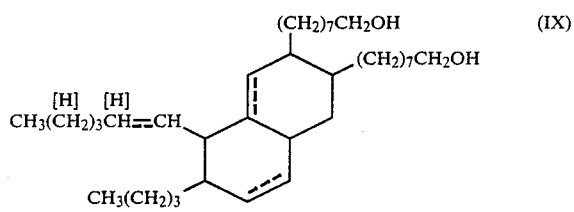

wherein the broken lines and hydrogen atoms in brackets indicate that the corresponding carbon-carbon bonds may be single or double bonds depending on the method of reduction. It is frequently found that the compounds of this invention which contain only single bonds have properties somewhat more favorable than those of the analogous double-bonded compounds. Suitable diol mixtures of this type are commercially available from Henkel Corporation under the trade name "Dimerol".

Other suitable polyhydroxy compounds within this first preferred class may be prepared by reduction of various acrylic acid-unsaturated fatty acid condensation products. These polyhydroxy compounds may be illustrated by the formula

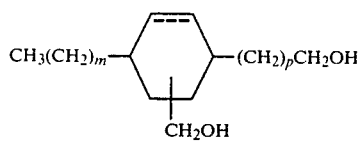

wherein m may be, for example, from 3 to 5, p may be from 7 to 9 and the sum of m and p is 12. A typical commercially available dicarboxylic acid which may be reduced to a diol of formula X is sold under the trade designation "Westvaco 1550 Diacid"; it has the formula

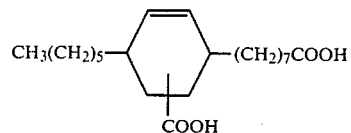

and is an adduct of linoleic and acrylic acids. It is also described in Kirk-Othmer, op. cit, at p. 779.

A second preferred class of polyhydroxy compounds consists of 1,2-alkanediols in which $R^1$ has the formula

wherein $R^3$ is an alkyl radical containing about 8–28 carbon atoms. Acrylates of such 1,2-alkanediols, and polymers thereof, are disclosed and claimed in copending, commonly assigned application Ser. No. 562,893, filed Dec. 19, 1983, the disclosure of which is incorporated by reference herein.

Examples of suitable $R^3$ radicals are 1-octyl, 2-methylheptyl, 1-nonyl, 2,3-dimethylheptyl, 1-decyl, 2-dodecyl, 1-tetradecyl, 1-octadecyl, 1-eicosyl and 1-docosyl. Radicals having the formula $R^4CH_2$, wherein $R^4$ is an alkyl and especially a straight chain alkyl radical having about 7–27 and most often about 9–17 carbon atoms, are preferred as $R^3$.

Procedures for acrylic or methacrylic acid esterification of the above-described polyhydroxy compounds will be apparent to one skilled in the art. Thus, the acid and alcohol may typically be reacted in a suitable solvent, in the presence of a small amount of an acidic esterification catalyst such as sulfuric acid, p-toluenesulfonic acid, acidic ion exchange resins or acidified clays. Ordinarily, a stoichiometric excess of the acid is used, the ratio of equivalents of acid to diol typically being between about 2:1 and about 4:1. The reaction is ordinarily carried out at about 100°–200° C., most often about 100°–150° C. It is often preferred to incorporate in the esterification mixture a minor amount of a polymerization inhibitor such as p-methoxyphenol, 2,6-di-t-butylphenol or 2,4,6-tri-t-butylphenol. The acrylic or methacrylic acid may be replaced by a functional derivative thereof such as an acyl halide, lower alkyl ester or amide, with suitable modification of the reaction conditions.

The preparation of the polyfunctional acrylates whose polymers are suitable for use as dielectrics in the capacitors of this invention is illustrated by the following examples.

EXAMPLE 1

A mixture of 102 parts by weight (0.34 mole) of a commercially available (from Henkel Corporation) diol having the formula

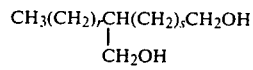

in which the sum of r and s is 15, 2.55 parts of p-methoxyphenol and 2.38 parts of p-toluenesulfonic acid in 153 parts of n-hexane was heated to reflux with stirring and 54.4 parts (0.76 mole) of acrylic acid was added over several hours. Heating was continued as water was removed by azeotropic distillation. When the theoretical amount of water had been removed, the solution was diluted with 206 parts of n-hexane and extracted five times with a 3% (by weight) aqueous potassium hydroxide solution and twice with aqueous sodium chloride solution. Upon evaporation of the hexane, there was obtained 127 parts (92% of theoretical) of the diacrylate of formula II which was filtered through glass fibers and stabilized by the addition of 100 ppm of p-methoxyphenol.

EXAMPLE 2

A mixture of 100 grams (0.3 mole) of a commercially available (from Henkel Corporation) triol having the formula

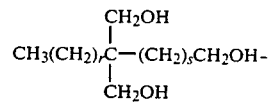

in which the sum of r and s is 15, 0.3 gram of p-methoxyphenol and 2 grams of p-toluenesulfonic acid in 500 ml. of toluene was heated to 120° C. and 115 ml. (1.64 moles) of acrylic acid was added dropwise. Heating was continued as water was removed by azeotropic distillation. When the theoretical amount of water had been removed, the solution was washed with aqueous potassium carbonate solution and dried. The desired triacrylate was obtained as a liquid upon evaporation of solvent.

EXAMPLE 3

Following a procedure similar to that of Example 2, 1,12-octadecanediol diacrylate was prepared.

EXAMPLE 4

To a solution of 96 grams (2.5 moles) of lithium aluminum hydride in 3000 ml. of tetrahydrofuran was added dropwise, with stirring, 400 grams (0.71 mole) of "Empol 1010" dimer acid. The mixture was heated under reflux for about 40 hours and then neutralized by the sequential addition of 96 ml. of water, 96 ml. of 15 percent aqueous sodium hydroxide solution, and 288 ml. of water. The neutralized mixture was filtered and the solvent was evaporated from the filtrate to yield the desired diol.

A solution of 200 grams (0.37 mole) of the diol, 157 ml. (2.24 moles) of acrylic acid, 3 grams of p-toluenesulfonic acid and 0.5 gram of p-methoxyphenol in 1000 ml. of toluene was heated under reflux as water was removed by azeotropic distillation. When the stoichiometric amount of water (about 13.3 ml.) had been removed, the solution was cooled, filtered and washed several times with dilute potassium carbonate solution and once with dilute sodium chloride solution. It was then dried over magnesium sulfate and the solvent was evaporated to afford the desired diacrylate as a liquid.

EXAMPLE 5

Following the procedure of Example 4, "Westvaco 1550 Diacid" was reduced by lithium aluminum hydride in tetrahydrofuran to a diol having formula VIII in which m is 5, p is 7 and the broken line indicates a double bond. This diol (85 grams, 0.25 mole) was reacted with acrylic acid (90 ml., 1.28 mole) in toluene solution to yield the desired diacrylate as a liquid.

EXAMPLE 6

Following a procedure similar to that of Example 2, a liquid diacrylate was prepared from a commercially available diol which was in turn prepared by hydrogenation of a methyl ester of linoleic acid dimer, and whose principal components have formulas VII, VIII and IX wherein the broken lines represent predominantly single bonds.

EXAMPLE 7

A solution of 51 grams (0.20 mole) of 1,2-hexadecanediol, 100 ml. (1.5 moles) of acrylic acid, 1.5 grams of p-toluenesulfonic acid and 2 grams of p-methoxyphenol in 400 grams of toluene was heated for about 24 hours under reflux as water was removed by azeotropic distillation. The solution was cooled, filtered and washed several times with dilute potassium carbonate solution and once with dilute sodium chloride solution. It was then dried and the solvent was evaporated to afford the desired 1,2-hexadecanediol diacrylate as a liquid.

The polyfunctional acrylates may be polymerized under free-radical conditions, either alone or in the presence of other monomers. The term "polymer," as used herein, includes addition homopolymers and copolymers with one or more other monomers.

Polymerization by the free-radical method may be effected in bulk, solution, suspension or emulsion, by contacting the monomer or monomers with a polymerization initiator either in the absence or presence of a diluent at a temperature of about 0°-200° C. Suitable initiators include benzoyl peroxide, tertiary butyl hydroperoxide, acetyl peroxide, hydrogen peroxide, azobisisobutyronitrile, persulfate-bisulfite, persulfate-sodium formaldehyde sulfoxylate, chlorate-sulfite and the like. Alternatively, polymerization may be effected by irradiation techniques, as by ultraviolet, electron beam or plasma irradiation. The polymers thus obtained are generally crosslinked, as a result of the polyfunctionality of the acrylates.

A preferred subgenus of the capacitors of this invention consists of those in which the dielectric member is a polymer in which all of the units are derived from polyfunctional acrylates of formula I. Also contemplated are copolymers of said polyfunctional acrylates with other mono- and polyacrylates. Illustrative of suitable monoacrylates are those of higher monohydroxy alcohols such as isodecyl alcohol or of higher monoepoxides, the term "higher" denoting at least 8 carbon atoms. The preferred copolymers, however, are those with other polyfunctional acrylates illustrated by those of such compounds as trimethylolpropane, neopentyl glycol, polybutadiene-derived polyols and polyepoxides. The copolymers are typically prepared from blends comprising about 25-75% by weight of the said polyfunctional acrylates of formula I, with the balance being other acrylates.

The capacitors of the invention have particularly advantageous properties, including high efficiency and low dissipation factors, when their configuration is disclosed and claimed in the above-identified applications Ser. Nos. 562,779 and 620,647. Capacitors of this type may be produced by depositing alternating electrode and dielectric layers so as to provide alternate electrode layers with portions projecting from the stack and contacting each other in electrically connected relation.

The particular suitability of the polymers of this invention as capacitor dielectrics is illustrated by the following examples.

EXAMPLE 8

Uniform prototype capacitors were produced by drawing down a monomer layer on an aluminum foil substrate, polymerizing said monomer layer by contact with a 10-megarad electron beam, and depositing a metallic aluminum layer thereon. The thickness of the aluminum foil electrode was 12.5 microns, that of the dielectric layer was 3-6 microns and that of the deposited aluminum electrode was 300-500 Angstroms (0.03-0.05 micron). The areas of the prototype capacitors were about 1 square inch. The dissipation factors of said capacitors were measured at 60 Hz. using an AC bridge. The results are given in Table I.

|  | Dissipation factor, % | | |
| --- | --- | --- | --- |
| Example | 30° C. | 90° C. | 130° C. |
| 1 | 2.7 | 0.40 | 0.15 |
| 2 | 0.85 | 1.10 | 0.95 |
| 4 | 0.75 | 0.05 | 0.025 |
| 5 | 0.95 | 0.70 | 1.95 |
| 6 | 1.7 | 0.10 | 0.12 |

As will be apparent from the table, capacitors of this invention are characterized by versatility of application, typically including extremely low dissipation factors at both high and low temperatures.

EXAMPLE 9

A prototype capacitor produced as described in Example 8 in which the dielectric was a homopolymer of 1,2-hexadecanediol diacrylate (the product of Example 7) had a dissipation factor which varied from 0.8 at 30° C. to 0.45 at 110° C. and 0.6 at 150° C. and a change in capacitance which, using the value at 30° C. as a baseline, varied from +1.2% at 80° C. to −0.8% at 150° C. These results show that said homopolymer, when used as a capacitor dielectric, is characterized by particularly low capacitance change over a wide range of temperatures.

EXAMPLE 10

The procedure described in the aforementioned application Ser. Nos. 562,779 and 620,647 used to prepare a capacitor about 18 mm. in width. The substrate was aluminum foil about 50 microns thick. Alternate dielectric (thickness about 1 micron) and electrode (thickness about 200-500 Angstroms) layers were deposited. The dielectric layers were formed by evaporation of the product of Example 1 at 375° C. and deposition on an electrode surface maintained at 24° C., followed by electron beam-initiated polymerization, and the electrode layers by vapor deposition of aluminum. The finished capacitor contained 1000 layers each of dielectric and deposited electrode. The dissipation factor thereof, measured at 60 Hz. over a 30°–150° C. temperature range, varied from a maximum of 3.10% at 30° C. to a minimum of 0.300% at 150° C.

EXAMPLE 11

A capacitor was prepared as described in Example 10, except that dielectric was a polymer of the product of Example 6, said product was deposited by evaporation at 400° C. and deposition at 48° C., the thickness of the electrode layers was 300–500 Angstroms and the capacitor contained 200 layers each of dielectric and deposited electrode. The dissipation factor thereof, measured at 100 Hz. over a 30°–130° C. temperature range, varied from a maximum of 2.8% at 30° C. to a minimum of 0.7% at 90°–130° C.

EXAMPLE 12

A number of capacitors, prepared as in Example 10 except for numbers of layers and dielectric layer thickness in some cases, were cut to various sizes to provide specific capacitance values and tested for extended periods under the AC voltage and temperature conditions listed in Table II. None of said capacitors had failed at the ends of the test periods listed.

TABLE II

| Layers | Dielectric thickness, microns | Capacitance, microfarads | Voltage | Temp. °C. | Hours |
|---|---|---|---|---|---|
| 1000 | 1.2 | 0.2 | 20 | 130 | 500 |
| 100 | 1.1 | 0.19 | 50 | 85 | 664 |
| 930 | 1.1 | 0.19 | 25 | 85 | 68 |
|  |  |  | 50 | 85 | 609 |
| 500 | 1 | 2 | 20 | 130 | 1123 |
| 500 | 1 | 0.11 | 25 | 85 | 68 |
|  |  |  | 50 | 85 | 776 |
| 500 | 1.1 | 0.1 | 25 | 85 | 68 |
|  |  |  | 50 | 85 | 776 |

These results show the stability of the capacitors of this invention over prolonged operation periods at relatively high temperature.

What is claimed is:

1. A capacitor comprising two electrodes separated by a dielectric member, said dielectric member comprising a polymer of at least one polyfunctional acrylate having the formula

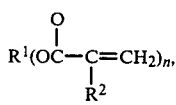

wherein $R^1$ is an aliphatic, alicyclic or mixed aliphatic-alicyclic radical derived from a polyhydroxy compound of the formula $R^1(OH)_n$ and having about 10–40 carbon atoms which optionally contains up to about three olefinic linkages, said olefinic linkages being non-conjugated;

$R^2$ is hydrogen or methyl; and n is from 2 to 4.

2. A capacitor according to claim 1 wherein the electrodes are aluminum.

3. A capacitor according to claim 2 wherein the dielectric member is a polymer in which all of the units are derived from said polyfunctional acrylate.

4. A capacitor according to claim 2 wherein the dielectric member is a copolymer of said polyfunctional acrylate with at least one of acrylates of higher monohydroxy alcohols, higher monoepoxides, polyols and polyepoxides.

5. A capacitor according to claim 2 wherein $R^2$ is hydrogen.

6. A capacitor according to claim 5 wherein $R^1$ has at least 18 carbon atoms in a single chain.

7. A capacitor according to claim 6 wherein $R^1$ is a branched chain radical.

8. A capacitor according to claim 7 wherein the polyfunctional acrylate has one of the formulas

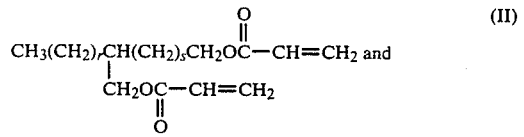

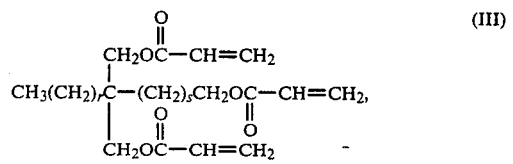

wherein r and s are each 7 or 8 and the sum of r and s is 15.

9. A capacitor according to claim 8 wherein the polyfunctional acrylate has formula II.

10. A capacitor according to claim 8 wherein the polyfunctional acrylate has formula III.

11. A capacitor according to claim 2 wherein $R^1$ is at least one aliphatic or alicyclic radical containing about 20–40 carbon atoms and optionally up to about three non-conjugated olefinic linkages, at least about 40% of said $R^1$ radicals containing alicyclic moieties.

12. A capacitor according to claim 11 wherein $R^2$ is hydrogen.

13. A capacitor according to claim 12 wherein $R^1$ is derived from at least one polyhydroxy compound prepared by reduction of at least one corresponding polycarboxylic acid or ester thereof.

14. A capacitor according to claim 13 wherein the polycarboxylic acid is linoleic acid dimer.

15. A capacitor according to claim 13 wherein the polyhydroxy compound has the formula

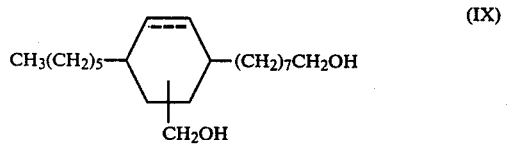

wherein the broken line indicates a single or double bond.

16. A capacitor according to claim 2 wherein $R^1$ has the formula

wherein $R^3$ is an alkyl radical having about 8–28 carbon atoms.

17. A capacitor according to claim 16 wherein $R^2$ is hydrogen.

18. A capacitor according to claim 17 wherein $R^3$ has the formula $R^4CH_2$, wherein $R^4$ is an alkyl radical.

19. A capacitor according to claim 18 wherein $R^4$ is a straight chain alkyl radical having about 9–17 carbon atoms.

20. A capacitor according to claim 19 wherein $R^3$ is n-tetradecyl.

* * * * *